United States Patent [19]

Skaggs et al.

[11] Patent Number: 6,106,603
[45] Date of Patent: Aug. 22, 2000

[54] STABLE SUSPENSION OF HYDROCOLLOIDS AND SUPERPLASTICIZER

[75] Inventors: Bryan Skaggs, San Diego; Harold Dial, El Cajon; Walter Rakitsky, San Diego, all of Calif.

[73] Assignee: Pharmacia Corporation, St. Louis, Mo.

[21] Appl. No.: 09/061,521

[22] Filed: Apr. 16, 1998

Related U.S. Application Data

[63] Continuation of application No. 08/476,836, Jun. 7, 1995, abandoned.

[51] Int. Cl.[7] .......................... C09K 7/02; C09D 101/28; C09D 105/00; C04B 24/24; C04B 24/38
[52] U.S. Cl. .................... 106/205.6; 106/724; 106/725; 106/726; 106/730; 106/804; 106/805; 106/802; 106/809; 106/172.1; 106/191.1; 106/205.01; 106/287.32; 106/287.35; 523/131; 524/4; 524/5; 507/103; 507/108; 507/110; 507/114; 507/120; 507/124
[58] Field of Search .................... 106/724, 725, 106/726, 730, 802, 804, 805, 172.1, 191.1, 205.01, 206.6, 287.32, 287.35; 523/131; 524/4, 5; 507/103, 108, 110, 114, 120, 124, 135

[56] References Cited

U.S. PATENT DOCUMENTS

| | | | |
|---|---|---|---|
| 3,948,672 | 4/1976 | Harnsberger et al. | 106/720 |
| 4,021,257 | 5/1977 | Bernett | 106/730 |
| 4,043,827 | 8/1977 | Bernett | 106/730 |
| 4,217,229 | 8/1980 | Watson | 252/8.55 R |
| 4,342,866 | 8/1982 | Kang et al. | 536/119 |
| 4,462,836 | 7/1984 | Baker et al. | 106/730 |
| 4,662,943 | 5/1987 | Baker et al. | 106/720 |
| 4,792,415 | 12/1988 | Colegrove | 252/308 |
| 4,963,668 | 10/1990 | Allen et al. | 536/114 |
| 4,981,520 | 1/1991 | Hoskin et al. | 106/208 |
| 5,004,506 | 4/1991 | Allen et al. | 106/730 |
| 5,151,131 | 9/1992 | Burkhalter et al. | 106/730 |
| 5,174,821 | 12/1992 | Matsuoka et al. | 106/730 |
| 5,175,277 | 12/1992 | Rakitsky et al. | 106/729 |
| 5,180,430 | 1/1993 | Gartner et al. | 106/730 |
| 5,228,524 | 7/1993 | Johnson et al. | 175/72 |
| 5,290,768 | 3/1994 | Ramsay et al. | 514/54 |

FOREIGN PATENT DOCUMENTS

| | | | |
|---|---|---|---|
| 0654516A | 5/1995 | European Pat. Off. | C09K 7/02 |
| 86/00291 | 1/1986 | WIPO | 106/730 |

*Primary Examiner*—David Brunsman
*Attorney, Agent, or Firm*—Fitzpatrick, Cella, Harper & Scinto

[57] ABSTRACT

The present invention comprises a stable hydrocolloid composition in which preferably welan gum is uniformly dispersed in a superplasticizer solution such as sulfonated naphthalene, sulfonated melamine, modified lignosulfate, their derivatives and solution thereof. The mixture is wet milled to form an extremely fine particle size, from about 3 microns to about 500 microns distribution of the gum. The composition is rapidly hydratable and useful as a stabilizing additive in many cement and drilling fluid applications.

15 Claims, No Drawings

STABLE SUSPENSION OF HYDROCOLLOIDS AND SUPERPLASTICIZER

CROSS REFERENCE TO RELATED APPLICATION

THIS IS A CONTINUATION OF U.S. patent application Ser. No. 08/476,836 FILED Jun. 7, 1995, now abandoned, ENTITLED "STABLE SUSPENSION OF HYDROCOLLOIDS AND SUPERPLASTICIZER."

FIELD OF THE INVENTION

The present invention relates generally to industrial gums and their use in cements, masonry grouts, oil field drilling fluids and the like. More specifically, the invention relates to an improved welan gum composition and its numerous applications in this area.

BACKGROUND OF THE INVENTION

Concretes and mortars are cement compositions additionally containing aggregate (e.g., sand and rock) and water. When water is added to the cement, this forms a paste which hardens to a solid structure. Various additives have been used in these cement compositions to modify their properties for specialized applications. For example, long fibers such as asbestos reduce the sagging of these pastes and thus is beneficial when applying tiles to a vertical surface. Freezing point depressants are used when cements are to be poured in subfreezing temperatures. Cellulosic based polymers have been used in cements to control water retention, working time, and in certain cases, the sedimentation of particles in the pastes. Bentonite clay has also been used for this purpose. Other polymers, such as the polyvinyl alcohols and methyl methacrylates, have been used to reduce friction when pumping these pastes and to otherwise modify their workability. Fumed silica is used as an additive to make stronger concrete with reduced permeability.

The term "cement compositions" refers to hydraulic cements such as finely ground and calcined calcium silicates and calcium aluminates which when mixed with water react to form a hard, rock-like mass. There are many well known cement compositions such as: portland cement, portland pozzolan cement (containing about 15–40% pozzolan), blast furnace slag cement, slag cement (containing blast furnace slag and hydrated lime), masonry cement (e.g., adhesive mortars), construction concrete (containing sand and aggregate, oil-well cement (i.e., cements with retarders to prevent rapid setting so that they may be used at the high temperature and pressure environments of deep wells), aluminous cement (containing high amounts of calcium aluminates, expansive cements (containing high sulfate and alumina concentrations and which expand on hardening), air entrained cement (containing compounds which retain air bubbles and thus yield frost- and chemical-resistant concretes), lightweight concrete (containing low density materials such as furnace clinker, pumice, foamed slag, fly ash, gas, wood, etc.) heavy concrete (containing dense material such as barite, iron ore (i.e., ilmenite or hematite), steel, etc.), and low heat concrete (with modified compositions that minimize heat generation during the setting process).

With respect to oilfield cements, it is desirable, while drilling a subterranean well, to line the surface of the hole with hollow pipe known as casing. The casing is held in place by attaching the casing to the borehole wall with a cement slurry. The cement slurry is put in place by pumping the slurry down the inside of the casing to the bottom of the hole and up the annulus between the casing and borehole wall. The cement is then allowed to set for several hours to gain strength before any other operation is commenced.

The main purposes of primary cementing are:
1. Most importantly, to allow the segregation of individual formations behind the pipe so that fluids from one formation cannot flow into another, i.e., the cementation of an oil/gas well. This allows for the production from a specific zone.
2. To add support for the casing by physically bracing or preventing the formation of pressure imposed on the casing.
3. To retard corrosion by minimizing contact between the casing and corrosion formation waters.

Oilfield cements are similar to those used in construction (i.e., portland cement). The American Petroleum Institute has set specifications for oilfield cements. These as classified as "A" through "H", "J" and "N", all of which the present invention is useful in.

Cement additives in oilfield cements are materials mixed in the slurry for one or more of the following purposes:
1. Reducing or increasing density;
2. Increasing volume at reduced unit cost;
3. Accelerating or retarding slurry thickening time;
4. Increasing strength;
5. Preventing loss of whole cement slurry;
6. Increasing or improving the cement's durability;
7. Decreasing water loss from the slurry;
8. Increasing or decreasing the viscosity of the cement slurry; and
9. Preventing gas migration.

The water loss of a "neat" cement slurry (cement and water only) is very high and rapid. When a slurry contacts a porous formation rock (such as an oil bearing sandstone) it may become quickly dehydrated by the water filtering into the formation. This causes the cement to "flash set." This may cause the casing to stick to the borehole before all the slurry is pumped in the annulus or before the casing is in the proper position.

Bentonite in concentrations of 0–14% (wt./wt. of dry cement) has been used in the past to control the water loss from the slurry. Cellulosic polymers such as carboxymethylhydroxyethyl cellulose (CMHEC) and hydroxyethyl cellulose (HEC) have also been used as water loss control agents and control the set of the cement at levels from about 0.2% to 0.9%.

Welan gum is an industrial grade of a bacterial polysaccharide produced by the growth of the Alcaligenes strain ATCC 31555 in a pure culture fermentation using carbohydrates as a carbon source. The product is recovered from the fermentation broth by precipitation with alcohol. Welan gum is a polysaccharide gum which comprises principally a heteropolysaccharide containing the neutral sugars D-glucose, D-glucuronic acid, L-rhamnose and L-mannose and glycosidically linked acetyl ester groups. The structure of this polysaccharide is described in Jansson P E, Linberg B, and Wildmalm G (1985) *Carbohydrate Research* 139, 217–223.

The rapidly hydrating welan gum composition used in the present invention is a novel combination of welan gum and a superplasticizer. U.S. Pat. No. 4,342,866, to Kang et al., describes a procedure for making welan gum and this is hereby incorporated by reference.

U.S. Pat. No. 4,981,520 to Hoskin et al., discloses a welan gum composition comprising welan gum, a phenolic resin such as resorcinal and an aldehyde. The compositions form stable gels in low salinity brines and are useful in selectively plugging highly permeable zones in a subterranean formation such as oil wells. This improves sweep efficiency during fluid flood oil recovery processes.

U.S. Pat. No. 4,963,668 to Allen et al., teaches the use of a low viscosity welan gum in cement compositions that allegedly exhibit improved workability, suspension of aggregates flow characteristics and resistance to water loss. Preferably, the range of amounts of welan gum used is from 0.1–0.5%.

U.S. Pat. No. 5,004,506 also to Allen et al., teaches welan gum in cement compositions as before, wherein a dispersant such as sodium citrate, sodium naphthalene sulfonates and the like, is added to reduce the viscosity of cement slurries and to serve as an aid in fluid loss control by dispersing the particles in the slurry.

U.S. Pat. No. 5,175,277 to Rakitsky et al., teaches and claims a rapidly hydratable welan gum which can be mixed with a carrier that is usually a superplasticizer, i.e., a dispersant. This is added to a dry cement/water premix and improves the cements workability, its fluid retention and prevents settling.

Finally, U.S. Pat. No. 5,290,768 teaches and claims a welan gum composition comprising welan gum and ethylene glycol. The composition displays unique viscosity and thermal properties which makes it an excellent insulation material.

None of the cited prior art however, discloses a stabilized suspension comprised of a hydrocolloid such as welan gum and a superplasticizer selected from the group consisting of sulfonated napthalene, sulfonated melamiine, modified lignosulfate, their derivatives and mixtures thereof. Moreover, none of the prior art discloses welan gum/ superplasticizer compositions that are ground to an extremely fine particle size so as to afford its suspension superior viscosity and flow characteristics when used in cement, grout and oil field applications.

SUMMARY OF THE INVENTION

The present invention comprises a stable hydrocolloid composition in which the hydrocolloid is uniformly dispersed in a superplasticizer such as sulfonated naphthalene, sulfonated melamine, modified lignosulfate, their derivatives and mixtures thereof. Suitable hydrocolloids include welan gum, hydroxypropylmethyl cellulose (HPMC), hydroxyethyl cellulose, polyvinyl alcohol (PVA) and the like. The mixture is wet milled to form an extremely fine particle size distribution of the hydrocolloid. The composition is rapidly hydratable and useful as a stabilizing additive in many cement and drilling fluid applications.

DETAILED DESCRIPTION OF THE INVENTION

The present invention is comprised of a highly stabilized suspension consisting preferably of welan gum, or a similar hydrocolloid, that is uniformly dispersed in a superplasticizer. The liquid suspension provides a flowable welan gum product that hydrates rapidly and can be metered and dispersed into concrete, grout and related cement formulations using standard equipment known in the art. The welan and superplasticizer are wet-milled to produce an extremely fine particle size that improves the suspensions stability, increases the gums hydration rate and is not plagued with the associated dust problems of welan gum compositions known in the art.

Previously developed suspensions of welan gum, especially at low concentrations, are not generally stable and particles settle within a brief period of time. These suspensions also possess a slower rate of hydration which is a critical factor in the preparation of cement, grout and/or concrete useful in a number of applications including antiwashout compositions in oil and gas recovery operations. Moreover, it is a further object of this invention to use welan gum as a suspending agent for cement slurries. Although welan gum has been described in U.S. Pat. No. 4,342,866 to Kang et al. to be an excellent viscosifier and suspending agent in aqueous brines, it was unexpected that the polymer would be compatible with and increase the suspension properties of cement slurries. Many other commercially available polymers are not compatible or functional in cement slurries. The compatibility and suspension properties of welan gum are advantageous in several oilfield and industrial applications. For example, welan gum increases the workability of cement compositions, i.e., it improves the ability of cement slurries to be easily placed in crowded areas such as around reinforcing bars without the formation of "bleed water" and aggregate settling. Under such conditions a stiff or "dry" concrete slurry would be extremely difficult to position but a more mobile "wet" slurry would produce a weak concrete and would allow settling of the aggregate. An additional advantage of the welan gum or other similar hydrocolloid concrete is the ability to place and set the formations without the need for vibrators.

The liquid superplasticizer solution essentially functions as a delivery vehicle for the hydrocolloid such as welan gum as the combination of the two form a stable suspension. The welan gum, by its very nature, is rapidly hydratable and is uniformly dispersed in the plasticizer. The suspension remains stable for matters even at elevated temperatures over 100° F.

Superplasticizers are known to function as high range water reducers in the cement industry and as dispersants in the oilfield recovery industry as they reduce the required water content of cement and washout compositions up to 30%. Suitable plasticizer solutions useful in the practice of the present invention consist of sulphonated naphthalene, sulphonated melamine, modified lignosulfonate, their derivatives and mixtures thereof. Suitable derivatives include polynaphthalene sulphonate, sulphonated naphthalene formaldehyde, sulphonated melamine formaldehyde and the like. Other derivatives include the sodium salt of the sulphonated melamine formaldehyde, the sodium salt of sulphonated naphthalene formaldehyde and the calcium salt of sulphonated naphthalene formaldehyde.

The hydrocolloid and plasticizer are mixed generally in a 1:1 ratio and either alone or together with a bentonite extender are wet-milled in a milling apparatus such as a Hobart mixer or a Dyno-Mill to a uniform, extremely small particle size range of from about 3 $\mu$m to about 500 $\mu$m. Preferably, the hydrocolloid and plasticizer are ground into particles of from about 50 $\mu$m to about 200 $\mu$m.

The following examples are provided to more specifically set forth and teach means to prepare and utilize the hydrocolloid suspensions of the present invention. They are for illustrative purposes only however, and it is recognized that minor changes and variations can be made with respect to the components and parameters of the composition and process. To the extent that any such changes do not materially alter the final product or result they are to be considered as falling within the spirit and scope of the invention as recited by the claims that follow.

EXAMPLE 1

Two grout formulations were tested for such applications as masonry and prepared using cement components known in the art including a suspension comprised of the following. The percentages given are a weight percent basis of the total masonry grout composition.

|  | Formulation A | Formulation B |
| --- | --- | --- |
| Welan gum | 0.05% | 0.1% |
| Welan mesh size | 80 | 200 |
| Kaolin | 5.0% | 5.0% |
| Polynaphthalene sulphonate | 1.5% | 1.5% |

The suspension was produced using a high shear Hobart mixer.

The suspensions were mixed from 3.0 to 10.0 minutes to insure that the welan particles were uniformly distributed and not aggregated into clusters. The remaining grout components were then added and thoroughly mixed in a 1:1 water:grout ratio to distribute the stabilized suspension throughout the grout. Both grout compositions exhibited superior fluid loss control as measured by the Gelman Fluid loss test (10 psi for 10 min) and the higher mixing energy applied, the better the grout composition. Stability is significantly improved by reducing the welan gum particle size range and by removing any excess air from the sheared samples. Agglomerated particles are more likely to plug the porous media pore throats and reduce grout penetration.

EXAMPLE 2

Viscosity, fluid loss, and sedimentation of cement grouts containing blends of welan gum and HPMC (hydroxypropylmethyl cellulose) were measured to evaluate potential advantages of a blended product. The cement grouts were prepared with a Portland Type I/II cement at a 0.6 water/cement ratio with 1.14% superplasticizer based on the weight of cement (bwtc). A melamine based superplasticizer Sikament 86, was used to avoid any incompatibility problems with the cellulosic. Initial studies had been conducted to select a water/cement ratio and to determine the dose of superplasticizer required to minimize grout viscosity. The 100% welan gum and HPMC grouts contained 0.05% and 0.10% gum (bwtc), respectively. Three intermediate blend ratios were also evaluated as well as a control that contained super but no polymer.

Viscosity measurements were made on the Fann 35 (R1, B1,F1) over a shear rate range of 5 to 1000 sec$^{-1}$. Results for the 100% welan and HPMC grouts were as expected, with the welan gum effecting a more pseudoplastic profile compared to the cellulosic. Both grouts exhibit the same apparent viscosity at approximately 75 sec$^{-1}$. At less than 75 s$^{-1}$, the welan gum slurry is more viscous. One possible advantage to blending the gums would be an increase in the high shear rate viscosity which the HPMC could provide. This increase was found in all the blends tested.

Fluid loss measurements were made with a Gelman apparatus at 80 psid for 10 minutes. All grouts containing polymer lost 24–27% of available water compared to 48% for the control.

Sedimentation measurements were made by pouring columns of grout, allowing them to set, sectioning the column, and measuring the density. From the top of the column to the bottom, the control varied from less than 1.41 g/cc to 2.14 g/cc, showing severe sedimentation. The 100% HPMC grout varied from 1.62 g/cc to 2.14 g/cc compared to a very stable 1.75 g/cc to 1.77 g/cc for the 100% welan gum grout All blends tested were very similar to the 100% welan gum grout, that is, sedimentation stability can be achieved with these blends even at relatively low welan gum concentrations.

Therefore, it is evident that blends of welan gum and HPMC can result in grouts higher high shear rate viscosities than the straight welan slurries without sacrificing sedimentation stability.

EXAMPLE 3

Stabilized welan gum anti-washout suspensions were compared with two cellulosic anti-washout formulations in terms of hydration rate, viscosity, washout, slump, slump loss and static bleed. The hydration rate $T_{90}$ is measured as a function of the time it takes the composition to reach 90% torque using QC test procedures.

A welan gum/sulphonated melamine suspension was prepared and was added to the concrete anti-washout base in an amount of 0.15% based on the total weight of the anti-washout composition (bwtc). Hydroxpropylmethyl cellulose (HPMC) and hydroxyethyl cellulose (HEC) were similarly formulated as comparative anti-washout compositions. The following results were observed.

| % Washout Welan gum/sulphonated melamine at 0.15% | | | | | |
| --- | --- | --- | --- | --- | --- |
| T90 | Prehydrated | 2 min. | 4 min. | 7 min. | 13 min |
| Wet | 3.42% | 4.6% | 5.5% | 6.0% | 8.25% |
| Dry | | | 5.49% | 5.32% | 4.92% |

| % Washout | .15% HPMC | 1.0% HEC |
| --- | --- | --- |
| Wet | 6.08% | |
| Dry | 12.39% | 6.59% |

The lower percentages exhibited by the welan gum/sulphonated melamine compositions indicate improved hydration which consequently indicates a composition with improved washout control.

What we claim is:

1. An improved stabilized suspension comprised of a rapidly hydratable hydrocolloid uniformly dispersed in a superplasticizer solution, wherein said hydrocolloid and superplasticizer are milled together to a particle size range of from about 3 μm to about 500 μm.

2. The stabilized suspension of claim 1 wherein said hydrocolloid is selected from the group consisting of welan gum, hydroxypropylmethyl cellulose, polyvinyl alcohol, hydroxyethyl cellulose, polyacrylamide and mixtures thereof.

3. The stabilized suspension of claim 1 wherein said hydrocolloid is welan gum.

4. The stabilized suspension of claim 1 wherein said superplasticizer solution is selected from the group comprising sulfonated napthalene, sulfonated melamine, modified lignosulfate, their derivatives and mixtures thereof.

5. The stabilized liquid suspension of claim 1 further comprising bentonite, kaolin and a bentonite extender.

6. An improved cementitious grout with improved bond strength, flowability and stability comprising a stabilized suspension consisting of a rapidly hydratable hydrocolloid uniformly dispersed in a superplasticizer solution, wherein said hydrocolloid and superplasticizer are milled together to a particle size range of from about 3 μm to about 500 μm.

7. The cementitious grout of claim 6 wherein said hydrocolloid is selected from the group consisting of welan gum, hydroxypropylmethyl cellulose, hydroxyethyl cellulose, polyvinyl alcohol, polyacrylamide and mixtures thereof.

8. The cementitious grout of claim 6 wherein said hydrocolloid is welan gum.

9. The cementitious grout of claim 6 wherein said superplasticizer solution is selected from the group comprising sulfonated napthalene, sulfonated melamine, modified lignosulfate, their derivatives and mixtures thereof.

10. The cementitious grout of claim 6 further comprising bentonite, kaolin and a bentonite extender.

11. An anti-washout composition for flushing subterranean oil formations comprising a liquid stabilized suspension consisting of a rapidly hydratable hydrocolloid uniformly dispersed in a superplasticizer solution, wherein said hydrocolloid and superplasticizer are milled together to a particle size range of from about 3 $\mu$m to about 500 $\mu$m.

12. The anti-washout composition of claim 11 wherein said hydrocolloid is selected from the group consisting of welan gum, hydroxypropylmethyl cellulose, hydroxyethyl cellulose, polyvinyl alcohol, polyacrylamide and mixtures thereof.

13. The anti-washout composition of claim 11 wherein said hydrocolloid is welan gum.

14. The anti-washout composition of claim 11 wherein said superplasticizer solution is selected from the group comprising sulfonated naphthalene, sulfonated melamine, modified lignosulfate, their derivatives and mixtures thereof.

15. The anti-washout composition of claim 11 further comprising bentonite, kaolin and a bentonite extender.

* * * * *

UNITED STATES PATENT AND TRADEMARK OFFICE
CERTIFICATE OF CORRECTION

PATENT NO. : 6,106,603
DATED : August 22, 2000
INVENTOR(S) : BRYAN SKAGGS ET AL.

Page 1 of 2

It is certified that error appears in the above-identified patent and that said Letters Patent is hereby corrected as shown below:

COVER PAGE:

At [56] under "Related U.S. Application Data", please insert the following:

--[*] Notice: This patent issued on a continued prosecution application filed under 37 CFR 1.53(d), and is subject to the twenty year patent term provisions of 35 U.S.C. 154(a)(2).--

COLUMN 1:

Line 48, "aggregate," should read --aggregate),--;
Line 52, "aluminates," should read --aluminates),--.

COLUMN 2:

Line 38, "oil bearing" should read --oil-bearing--.

COLUMN 3:

Line 23, "cements" should read --cement's--;
Line 33, "napthalene," should read --naphthalene,--;
Line 64, "suspensions" should read --suspension's--;
Line 65, "gums" should read --gum's--.

UNITED STATES PATENT AND TRADEMARK OFFICE
CERTIFICATE OF CORRECTION

PATENT NO. : 6,106,603

DATED : August 22, 2000

INVENTOR(S) : BRYAN SKAGGS ET AL.     Page 2 of 2

It is certified that error appears in the above-identified patent and that said Letters Patent is hereby corrected as shown below:

COLUMN 5:

Line 66, "grout All" should read --grout. All--

COLUMN 6:

Line 4, "higher high" should read --having higher--;
Line 54, "napthalene" should read --naphthalene,--.

COLUMN 7:

Line 5, "napthalene" should read --naphthalene,--.

Signed and Sealed this

Eighth Day of May, 2001

Attest:

NICHOLAS P. GODICI

Attesting Officer      Acting Director of the United States Patent and Trademark Office